United States Patent [19]
Reddy

[11] Patent Number: 5,294,875
[45] Date of Patent: Mar. 15, 1994

[54] ENHANCED POLYPHASE MOTOR OPERATION USING A SOLID STATE INVERTER

[75] Inventor: Narasimha K. Reddy, Bolton, Conn.

[73] Assignee: Otis Elevator Company, Farmington, Conn.

[21] Appl. No.: 657,932

[22] Filed: Feb. 15, 1991

Related U.S. Application Data

[63] Continuation of Ser. No. 356,806, May 25, 1989, abandoned.

[51] Int. Cl.$^5$ .................. H02H 7/122; H02K 1/00
[52] U.S. Cl. .................. 318/801; 318/806; 310/179; 363/56
[58] Field of Search ............ 318/701, 724, 138, 254, 318/779, 760, 801–806, 809, 811, 696; 310/166, 179, 180, 13, 189; 363/93, 56, 58

[56] References Cited

U.S. PATENT DOCUMENTS

| | | | |
|---|---|---|---|
| 1,899,858 | 2/1930 | Early | 318/724 |
| 3,678,352 | 7/1972 | Bedford | 318/138 |
| 3,781,615 | 12/1973 | Mokrytzki et al. | 318/599 |
| 3,851,231 | 11/1974 | Eastham et al. | 310/13 |
| 3,906,267 | 9/1975 | Coupin et al. | 318/254 |
| 3,931,553 | 1/1976 | Stich et al. | 318/254 |
| 4,045,718 | 8/1977 | Gray | 310/198 |
| 4,321,494 | 3/1982 | MacNab | 310/179 |
| 4,484,127 | 11/1984 | Salihi et al. | 318/802 |
| 4,873,478 | 10/1989 | Weiss | 318/779 |
| 4,896,088 | 1/1990 | Jahns | 318/696 |
| 5,012,177 | 4/1991 | Dhyanchand et al. | 363/43 |

*Primary Examiner*—William M. Shoop, Jr.
*Assistant Examiner*—John W. Cabeca
*Attorney, Agent, or Firm*—Breffni X. Baggot

[57] ABSTRACT

A polyphase motor is powered by an inverter. Each phase winding in the motor comprises two electrically insulated, electromagnetically coupled, conductors, making up a "phase bundle." Each conductor in the bundle is powered by its own transistor drive. The drives for each phase winding respond to a common phase signal for instance from a pulse width modulator.

3 Claims, 2 Drawing Sheets

ENHANCED POLYPHASE MOTOR OPERATION USING A SOLID STATE INVERTER

This is a continuation of co-pending application Ser. No. 07/356,806 filed on May 25, 1989 now abandoned.

DESCRIPTION

1. Technical Field

This invention relates to motor controls, in particular, techniques and equipment for variable speed control of polyphase motors using transistorized inverters.

2. Background Art

The following patents, also assigned to the assignee of this application discuss in varying degrees variable speed polyphase motor controls U.S. Pat. No. 4,533,862, No. 4,484,127, No. 4,544,873, No. 4,456,097, No. 4,501,343, No. 4,483,419. One patent in particular, No. 4,484,127, offers a discussion of problems in protecting drive transistors in an inverter that provides primary drive current to the windings in a polyphase motor. Each winding is connected to the emitter-base connection of a complimentary pair of NPN and PNP transistors, driven by a driver. Generally speaking the driver varies the frequency and slip of the current. Motor speed and torque are fully variable through this process.

Transistor technology has advanced impressively over the years making possible construction of more powerful inverters. As a practical matter, inverter output capacity is limited by the maximum current handling capacity of the transistor pair connected to each winding. The highest power PNP transistors typically available have lower capacity than NPN transistors. The immediate implication is that the maximum current capacity of a single pair of complimentary transistors, for instance a pair used in the mentioned patents, is limited by current PNP power transistor technology.

In a solid state inverter in high power applications such as elevators and escalators each winding can be powered by multiple transistor pairs, each pair driven from the same phase input signal. Theoretically, available power for each winding can be multiplied that way. But transistor mismatches (different gain characteristics between transistors) often will result in one pair of transistors carrying more current than the other pair or pairs connected to the same winding. If a winding is receiving maximum drive current from a multiple pair, one pair actually can be driven beyond its safe operating currents, while others in the multiple pair operate below their maximum limits, (even though each pair theoretically is carrying the same current). Matching the transistors, which is possible, is very expensive but will not completely solve the mismatch problem. One of many reasons is that transistor operating characteristics as a function of ambient temperature can be very different between otherwise similar transistors.

That sophisticated transistor overcurrent conditions must be detected when multiple transistors pairs are used is easy to understand. Yet, circuitry that provides that function is complicated and expensive.

DISCLOSURE OF THE INVENTION

The present invention is concerned with increasing the power handling capacity of a transistor inverter.

According to the present invention, each phase winding of a polyphase motor (stator winding) is constructed of a plurality of insulated conductors wound together, as a bundle. Each conductor in the "phase bundle" is powered independently by its own transistor pair.

An advantage, and feature, of the invention is that interactions between transistor pairs is minute. For instance, the collector-emitter voltage of one pair is not impressed on another pair.

A major advantage is that a complete failure of the phase drive, for example, from a failure of another transistor pair is minimal compared to a state of the art arrangement with multiple transistor pairs connected to one conductor that makes up the phase winding.

Other benefits and features of the present invention will be apparent from the following discussion, wherein.

BEST MODE FOR CARRYING OUT THE INVENTION

Figure 1:
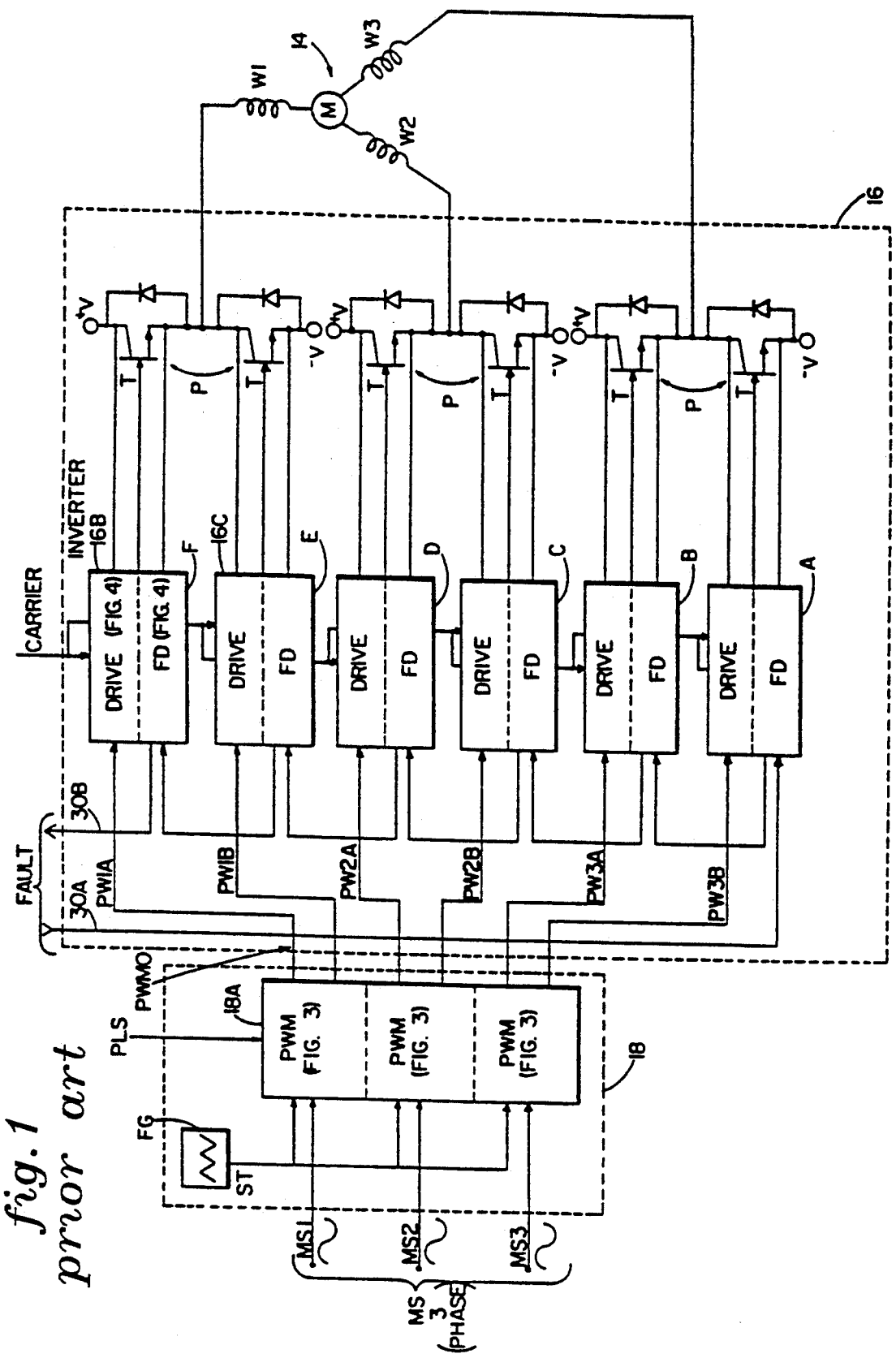
FIG. 1 is a prior art figure of FIG. 2 of U.S. Pat. No. 4,484,827.
Figures 2, 3:
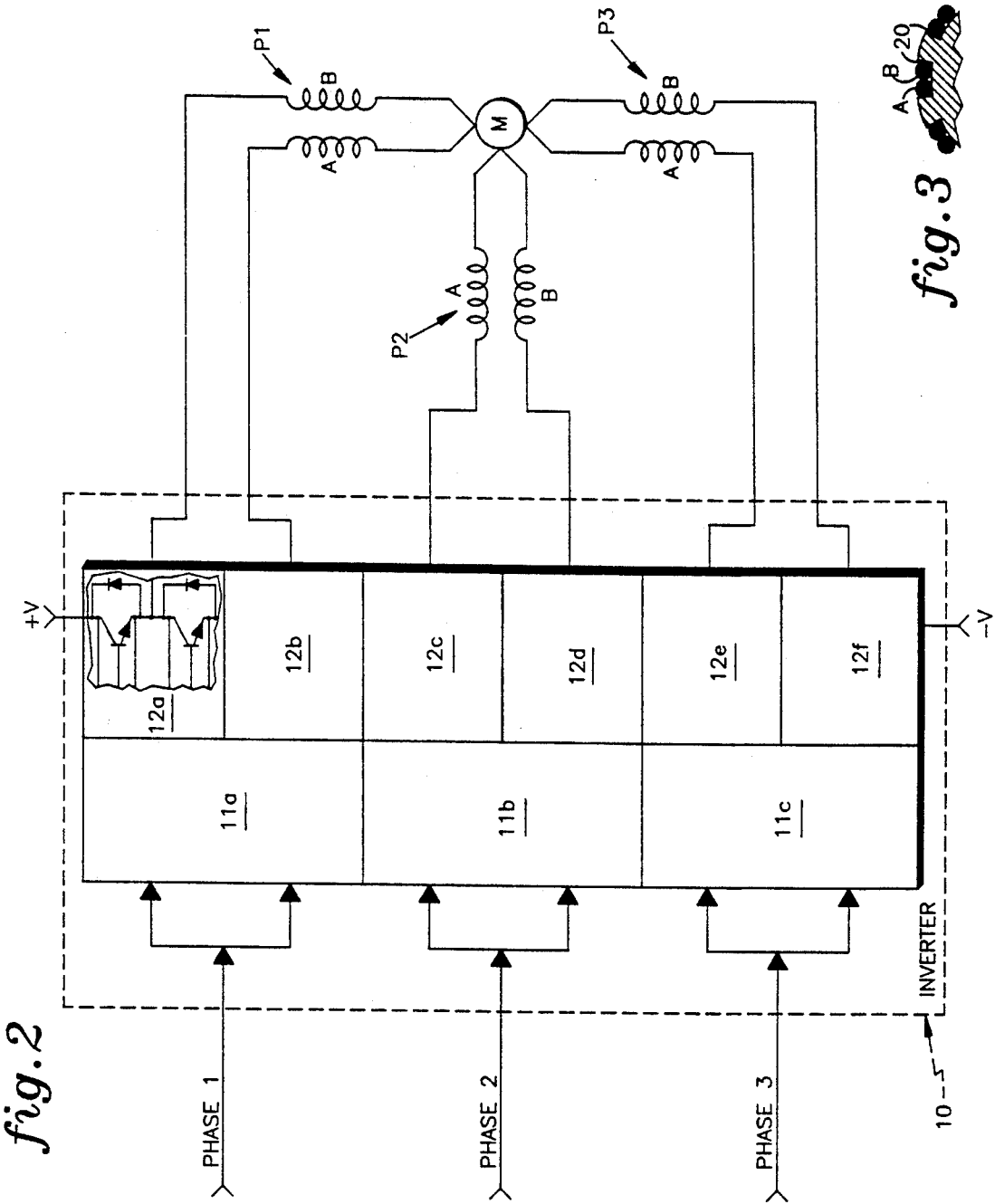
FIG. 2 is a cross-section, on a plane perpendicular to the motor's shaft, of a portion of a polyphase motor's stator containing phase windings according to the present invention.

In FIG. 2, an inverter 10 receives three signals Phase 1-3, analogous to the MS signals in U.S. Pat. No. 4,484,127. The inverter contains a transistor drive section 11a-c that receives the Phase 1-3 signals and produces output signals for a pair of phase drives 12a-f. Each drive section 11a-c may consist of a pulse width modulator, for instance as shown in U.S. Pat. No. 4,484,127. Each phase drive contains a pair of complementary connected transistors, like those shown at T in U.S. Pat. No. 4,484,127 (see FIG. 1). Each drive 12a-f is connected to a stator winding "bundle" in a polyphase motor M with each motor phase having at least two windings per winding "bundle". For example, windings A and B in phase P1 make up a winding bundle are powered by drives 12a and 12b.

FIG. 3 shows a small section of the motor's stator frame on which the windings are wound. Although the windings are assumed wound using conventional techniques, it should be noticed that in each slot 20 the winding actually consists of two electrical insulated windings, this being the windings A and B. In reality it must be appreciated that each slot contains many "turns" of each bundle, but whereas in the prior art the turns were but part of one conductor driven by a driver (e.g. drives 16B and 16C in FIG. 1 in this configuration there are two independently conductors receiving drive current in phase.

The available drive capacity for each inverter output phase is doubled by using a second pair of transistors, but because each pair drives its own winding and the windings for each phase are electromagnetically coupled, current imbalance between the transistor pairs is minute. As discussed earlier, if two transistor pairs drive the same winding, one pair may carry more current than the other; thus the available power capacity is not necessarily doubled. But, when each transistor pair drives its own winding, and the windings are electromagnetically coupled, the voltage drop across the two windings will track each. The current through each transistor pair will, in turn, also be the same, assuring that the total current to the phase winding (the output from both transistor pairs) is evenly divided between the two transistor pairs.

It should be understood that the size of each conductor in the phase bundle is roughly one-half the size of the conductor in a single conductor phase winding. The motor's horsepower, however, will remain the same, being a function of the total current in the phase winding, which is now split between the two conductors that comprise the phase winding. Owing to the fact that the current is accurately split between the transistor pairs, (e.g. in 12a and 12b FIG. 2)) it is possible to drive a motor at currents nearing the maximum capacity for the drive transistors. Previously, transistor power capacity had to be derated to accommodate possible current imbalances between transistor pairs driving the "same" conductor.

While the foregoing is a description of the best mode for carrying out the invention, it will instruct one skilled in the art sufficiently to make modifications and alterations to what has been described without departing from the true scope and spirit of the invention.

I claim:

1. A polyphase motor drive including an inverter and a polyphase motor, comprising:
   a plurality of phase drives, each phase drive responsive to a phase drive input signal, each phase drive for providing a current signal;
   a motor having a plurality of phase windings, each winding comprising at least two electrically insulated, electromagnetically coupled conductors wound together, each conductor corresponding to one of said phase drives, each of said conductors being responsive to a corresponding one of said current signals for providing current to said motor.

2. The polyphase motor drive of claim 1, wherein said phase windings are wound together in the same slot.

3. A polyphase motor drive, including a polyphase motor, comprising:
   a plurality of phase drives, each phase drive including a pair of complementary transistors, each phase drive responsive to a phase drive input signal, each phase drive providing a current signal;
   a motor having a plurality of phase windings, each phase winding comprising at least two electrically insulated conductors, each conductor corresponding to one of said phase drive, each conductor responsive to a corresponding one of said current signals for providing currents to said motor.

* * * * *